United States Patent
Lee et al.

(10) Patent No.: US 7,996,179 B2
(45) Date of Patent: Aug. 9, 2011

(54) METHOD OF MEASURING POSE OF MOBILE ROBOT AND METHOD AND APPARATUS FOR MEASURING POSITION OF MOBILE ROBOT USING THE SAME

(75) Inventors: Hyoung-Ki Lee, Seongnam-si (KR); Ki-Wan Choi, Anyang-si (KR); Seok-Won Bang, Seoul (KR); Woo-Yeon Jeong, Seoul (KR); Ji-Young Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 337 days.

(21) Appl. No.: 12/219,235

(22) Filed: Jul. 17, 2008

(65) Prior Publication Data
US 2009/0024353 A1 Jan. 22, 2009

(30) Foreign Application Priority Data

Jul. 19, 2007 (KR) .................. 10-2007-0072287

(51) Int. Cl.
*G01C 9/00* (2006.01)
*G06F 19/00* (2006.01)
(52) U.S. Cl. ........................ 702/153; 700/245
(58) Field of Classification Search .............. 702/153, 702/33, 36, 41, 44, 57, 64–65, 81, 84–85, 702/92, 94–97, 104–105, 127, 141–142, 702/145, 150–152, 154, 182–183, 188–189; 700/9–10, 28, 32–34, 56, 61–64, 66, 69, 700/245; 73/1.37–1.38, 1.75–1.77, 1.79, 73/488, 493, 503.3, 510–511, 514.01–514.02; 901/1, 36, 46–47
See application file for complete search history.

(56) References Cited

U.S. PATENT DOCUMENTS

2005/0065655 A1* 3/2005 Hong et al. ........... 700/245
2005/0126833 A1 6/2005 Takenaka et al. ....... 180/8.1

FOREIGN PATENT DOCUMENTS

JP 4-145323 5/1992
JP 2005-283600 10/2005

(Continued)

OTHER PUBLICATIONS

Ojeda et al., Improved Position Estimation for Mobile Robots on Rough Terrain Using Attitude Information, Aug. 2001, The University of Michigan, Technical Report UM-ME-01-01, pp. 1-14.*

(Continued)

*Primary Examiner* — Michael P Nghiem
*Assistant Examiner* — Toan M Le
(74) *Attorney, Agent, or Firm* — Staas & Halsey LLP (57) ABSTRACT

A method of measuring pose of mobile robot, and method and apparatus for measuring for measuring position of mobile robot using the same are provided. The apparatus for measuring the pose of a mobile robot includes an accelerometer measuring acceleration of the mobile robot in a forward direction, a uniform-motion-determining unit determining whether the mobile robot belongs to a uniform motion section, an acceleration section, or a deceleration section, and a pose-calculating unit calculating a pitch and a roll of the mobile robot in the uniform motion section, using the relationship between the measured acceleration in the forward direction and the acceleration due to gravity.

20 Claims, 11 Drawing Sheets
(4 of 11 Drawing Sheet(s) Filed in Color)

FOREIGN PATENT DOCUMENTS

| | | |
|---|---|---|
| KR | 2000-0022154 | 4/2000 |
| KR | 10-2006-0032880 | 4/2006 |
| KR | 10-2006-0049149 | 5/2006 |
| KR | 10-2006-0052753 | 5/2006 |
| WO | 03/090981 | 11/2003 |
| WO | 2004/010081 | 1/2004 |

OTHER PUBLICATIONS

Office Action dated Sep. 25, 2008 in Korean Patent Application No. 10-2007-0072287 (5 pp).

* cited by examiner

METHOD OF MEASURING POSE OF MOBILE ROBOT AND METHOD AND APPARATUS FOR MEASURING POSITION OF MOBILE ROBOT USING THE SAME

CROSS REFERENCE TO RELATED APPLICATION

This application claims priority from Korean Patent Application No. 10-2007-0072287 filed on Jul. 19, 2007 in the Korean Intellectual Property Office, the disclosure of which is incorporated herein by reference in its entirety.

BACKGROUND OF THE INVENTION

1. Field of the Invention

The present invention relates to a mobile robot, and, more particularly, to a technique for measuring the pose of a mobile robot and a technique for measuring the position of a mobile robot using a camera, an inertia sensor, and an encoder.

2. Description of the Related Art

In general, industrial robots have been developed to improve factory automation, and perform manufacturing processes in extreme environments in which human beings cannot work. In recent years, robotics technology has been used in the high-tech space development industry, which has lead to the development of human-friendly home service robots. In addition, small robots can be inserted into the human body instead of medical instruments to treat minute cellular texture which cannot be treated by existing medical instruments. Robotics technology has drawn attention as a next generation technology.

Home service robots, such as cleaning robots, have played a leading role in the expansion of the robotics technology focused on industrial robots used for only heavy industries to robotics technology focused on light industries. Cleaning robots generally include a driving unit for movement, a cleaning unit, and a positioning unit for measuring its position or the position of a remote controller.

In mobile robots, such as cleaning robots, it is a basic and important function to check its exact position. The absolute position of the mobile robot can be calculated by the following methods: using a beacon having an ultrasonic sensor provided therein; using an indoor GPS (global positioning system); and controlling a robot to extract feature points from an interior image captured by a camera, to register the extracted feature points, and to calculate the current position of the robot using the feature points. In addition, the relative position of the mobile robot can be calculated by the following methods: calculating the rotational speed of a mobile robot and the speed of the mobile robot traveling straight using an encoder and integrating the speeds; integrating an acceleration value obtained by an acceleration sensor twice; and integrating the rotational speed of the mobile robot, which is the output of a gyrosensor, to calculate a traveling direction.

Figure 1:
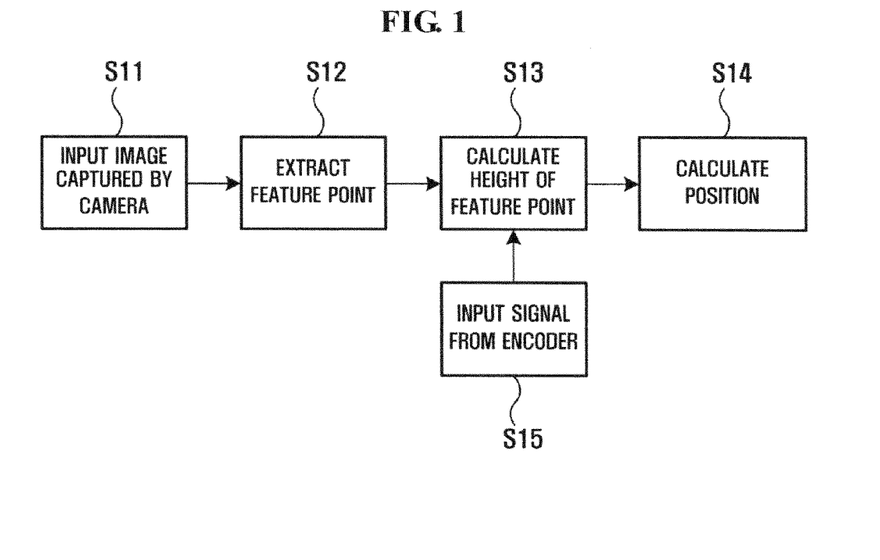
FIG. 1 is a diagram illustrating a method of measuring the position of a mobile robot using a camera and an encoder according to the related art.

The method using a camera and an encoder shown in FIG. 1 is generally used to calculate the absolute position of a mobile robot.

When an image captured by a movable camera is input (Step S11), the mobile robot extracts feature points from the input image and registers the extracted feature points (Step S12). However, first, it is necessary to calculate the height from the floor on which the mobile robot is positioned to the feature point (the height of the feature point) in order to measure the displacement of the mobile robot from the registered feature point (Step S13). In this case, the mobile robot uses signals (encoder signals) input from the encoder to calculate the height of the feature point (Step S15). After the height of the feature point is calculated, the registered feature point is compared with a feature point obtained while the mobile robot is moving to measure the displacement of the mobile robot (Step S14).

Figure 2:
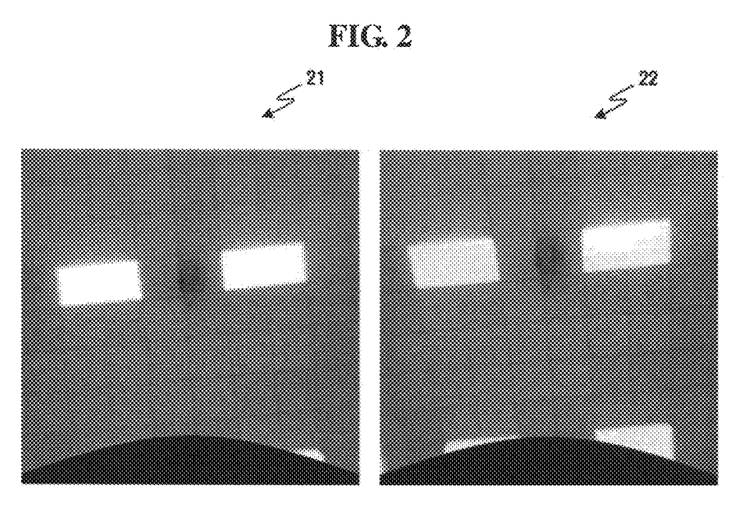
FIG. 2 is a diagram illustrating a variation in a ceiling image when the pose of the mobile robot is changed while remaining at the same position.

However, in the method shown in FIG. 1, when the pose of the camera is incorrect, the mobile robot may be erroneously operated. FIG. 2 shows a variation in a ceiling image when the pose of the mobile robot is changed at the same position. A left image 21 is a ceiling image when the mobile robot is disposed in parallel to the floor, and a right image 22 is a ceiling image when a front end of the mobile robot is slightly lifted. In the right image, the encoder value of the mobile robot is not changed, but the mobile robot determines that it moves backward on the basis of the captured image 22. As such, when the pose of the mobile robot or the pose of the camera is incorrect, an error in sensing may considerably increase due to a minute variation in pitch or roll. Therefore, it is very important to accurately measure the pose of the mobile robot in order to sense the displacement of the mobile robot.

The above-mentioned method has problems in that a large error may occur in the displacement of the mobile robot when the mobile robot is not parallel to the floor and it takes a lot of time to register feature points since the displacement of the robot is measured by an unreliable encoder and then the height of the feature point is calculated.

Figure 3:
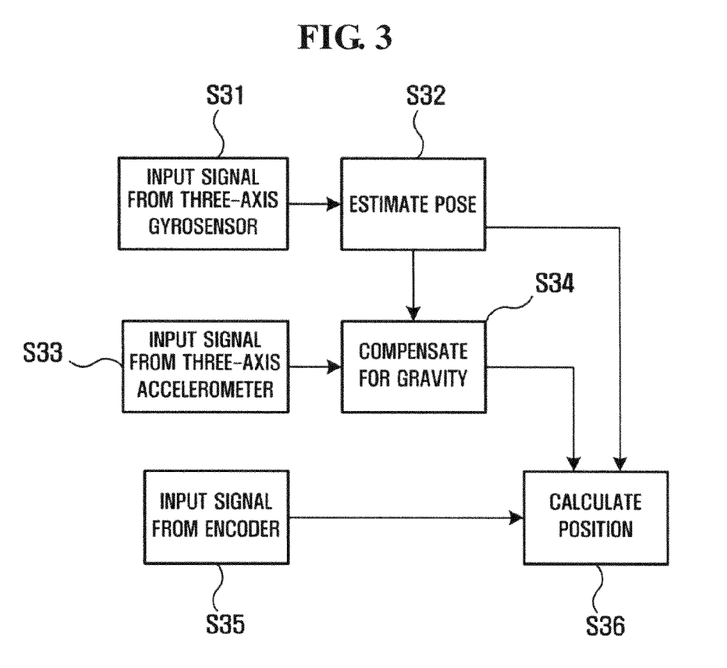
FIG. 3 is a diagram illustrating a method of measuring the position of a mobile robot using an inertia sensor and an encoder according to the related art.

Meanwhile, according to another method of calculating the position of the mobile robot, a value obtained by an inertia sensor, such as an accelerometer or a gyrosensor, is integrated to calculate the displacement of the mobile robot, and the obtained value is combined with the value obtained by the encoder, thereby improving the accuracy of measurement. FIG. 3 is a flowchart illustrating the method.

A value obtained by a three-axis gyrosensor is input to the mobile robot (Step S31), and the mobile robot estimates its pose using the input value (Step S32). A value obtained by a three-axis accelerometer is input to the mobile robot (Step S33), and the mobile robot performs a process of compensating for gravity (Step S34). Then, a value obtained by the encoder is input to the mobile robot (Step S35), and the mobile robot calculates the displacement obtained from the estimated pose (a roll, a pitch, and a yaw) and the compensated value of the accelerometer.

However, in this method, when the mobile robot travels straight at a low speed, the signal obtained by the accelerometer is so weak that it cannot be discriminated from noise. Therefore, the method has a low position-calculating performance, and when the inertia sensor is used to perform integration for a long time, the accuracy of integration is lowered.

SUMMARY OF THE INVENTION

An object of the invention is to provide a method and apparatus for measuring the pose of a mobile robot using an accelerometer, without using a pitch gyrosensor and a roll gyrosensor.

Another object of the invention is to provide a method and apparatus for measuring the position of a mobile robot using a camera, an inertia sensor, and an encoder.

Objects of the present invention are not limited to those mentioned above, and other objects of the present invention will be apparent by those skilled in the art through the following description.

In an aspect of the present invention, there is provided an apparatus for measuring the pose of a mobile robot, which includes an accelerometer measuring acceleration of the mobile robot in a forward direction; a uniform-motion-determining unit determining whether the mobile robot belongs to a uniform motion section, an acceleration section, or a deceleration section; and a pose-calculating unit calculating a pitch and a roll of the mobile robot in the uniform motion section, using the relationship between the measured acceleration in the forward direction and the acceleration due to gravity.

In another aspect of the present invention, there is provided an apparatus for measuring the position of a mobile robot, which includes an accelerometer measuring the acceleration of the mobile robot in a forward direction; a uniform-motion-determining unit determining whether the mobile robot belongs to a uniform motion section, an acceleration section, or a deceleration section; a pose-calculating unit calculating a pitch and a roll of the mobile robot in the uniform motion section, using the relationship between the measured acceleration in the forward direction and the acceleration due to gravity; a camera disposed on an upper surface of the mobile robot to capture a ceiling image; a feature-point-extracting unit extracting feature points from the captured ceiling image; a feature-point-compensating unit compensating for the coordinates of the extracted feature point using the calculated pitch and roll; and a position-calculating unit calculating the displacement of the mobile robot on the basis of the feature point whose coordinates are compensated.

In still another aspect of the present invention, there is provided a method of measuring the pose of a mobile robot, which includes measuring acceleration of the mobile robot in a forward direction using an accelerometer; determining whether the mobile robot belongs to a uniform motion section, an acceleration section, or a deceleration section; and calculating a pitch and a roll of the mobile robot in the uniform motion section, using the relationship between the measured acceleration in the forward direction and the acceleration due to gravity.

In still another aspect of the present invention, there is provided a method of measuring the pose of a mobile robot, which includes measuring acceleration of the mobile robot in a forward direction using an accelerometer; determining whether the mobile robot belongs to a uniform motion section, an acceleration section, or a deceleration section; calculating a pitch and a roll of the mobile robot in the uniform motion section, using the relationship between the measured acceleration in the forward direction and the acceleration due to gravity; capturing a ceiling image; extracting feature points from the captured ceiling image; compensating for the coordinates of the extracted feature point using the calculated pitch and roll; and calculating the displacement of the mobile robot on the basis of the feature point whose coordinates have been compensated.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become apparent by describing in detail preferred embodiments thereof with reference to the attached drawings in which.

DESCRIPTION OF THE PREFERRED EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which preferred embodiments of the invention are shown.

As described above, first, it is necessary to measure the pose of a mobile robot in order to measure the position of the mobile robot by means of a combination of a camera, an inertia sensor, and an encoder. The term "pose" includes a direction angle, that is, a pitch, a roll, and a yaw.

Figure 4:
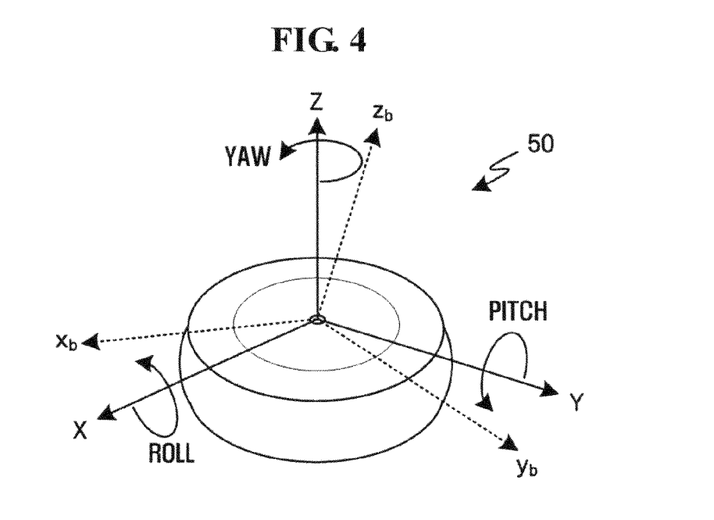
FIG. 4 is a diagram defining the pose of a mobile robot.

FIG. 4 is a diagram defining the pose of a mobile robot 50 according to an embodiment of the invention. In FIG. 4, an x-axis, a y-axis, and a z-axis are global coordinate axes that are fixed in space, and an $x_b$-axis, a $y_b$-axis, and a $z_c$-axis are local coordinate axes attached to the body of the mobile robot 50. When the mobile robot 50 moves in the x-direction, which is a forward direction, a pitch and a yaw can be defined as shown in FIG. 4. When the roll, the pitch, and the yaw occur, the global coordinate axes are misaligned with the local coordinate axes.

In general, the rotation angle, that is, the pitch, roll, and yaw of the mobile robot is measured by a gyrosensor, and the displacement of the mobile robot is measured by an encoder or an accelerometer. However, gyrosensors are more expensive than accelerometers, and is not suitable for a small, light-weight mobile robot. Therefore, this embodiment of the invention proposes a method of measuring the pose of a mobile robot, that is, the pitch and roll of a mobile robot, using an accelerometer, without using a pitch gyrosensor and a roll gyrosensor. In this case, the mobile robot is provided with only a yaw gyrosensor, not a three-axis gyrosensor.

Figure 5:
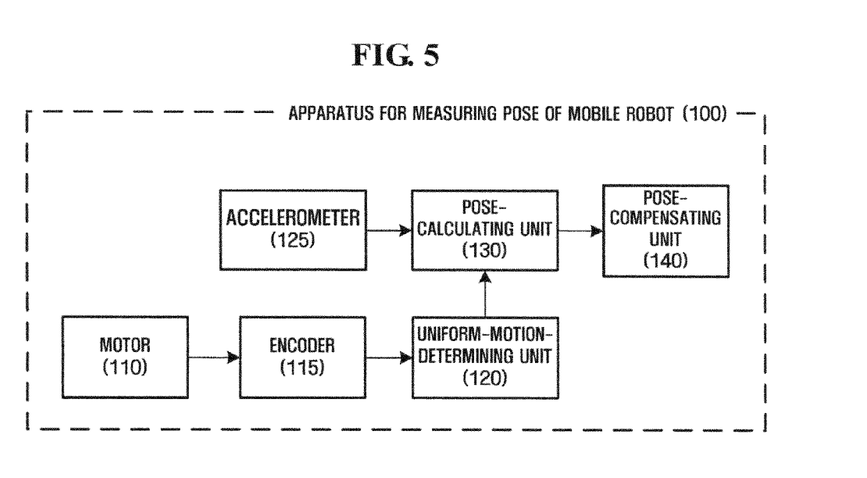
FIG. 5 is a block diagram illustrating the structure of an apparatus for measuring the pose of a mobile robot according to an embodiment of the invention.

FIG. 5 is a block diagram illustrating the structure of an apparatus 100 for measuring the pose of a mobile robot according to an embodiment of the invention. The pose-measuring apparatus 100 includes a motor 110, an encoder 115, a uniform-motion-determining unit 120, an accelerometer 125, a pose-calculating unit 130, and a pose-compensating unit 140.

The encoder 115 is called an odometer and is connected to traveling wheels provided in the mobile robot, and detects the number of rotations of the driving wheels. In general, the encoder 115 is provided in a mobile robot having rotating wheels as a moving unit.

The motor 110 supplies power to the mobile robot under the control of a motor controller (not shown). The motor 110 is just an illustrative example of a power supply unit, but any type of know actuator may be used as the motor 110.

Figure 6:
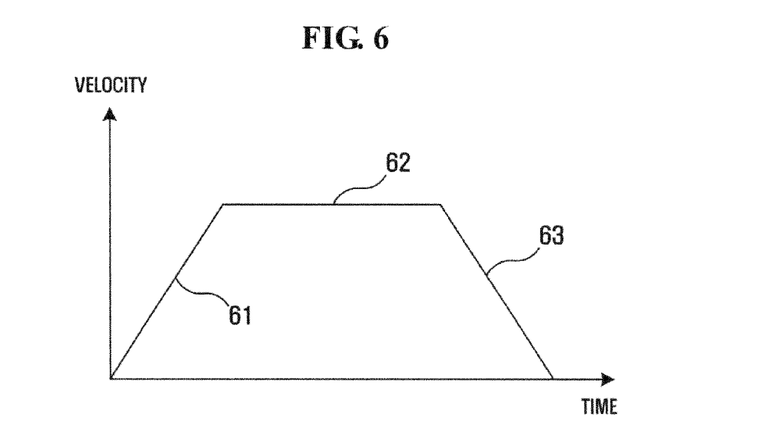
FIG. 6 is a diagram illustrating a velocity profile of the mobile robot.

The uniform-motion-determining unit 120 determines which of a uniform motion section, an acceleration section, and a deceleration section the current position of the mobile robot belongs to, among all moving routes of the mobile robot. The uniform-motion-determining unit 120 may determine which section the mobile robot belongs to on the basis of signals output from the encoder 115. Alternatively, the uniform-motion-determining unit 120 may directly receive information on these sections from the motor controller. This is, in order to move the mobile robot from a starting point to a destination point, the motor controller controls the motor 110 such that the motion of the mobile robot has a trapezoidal velocity profile as shown in FIG. 6. The trapezoidal velocity profile is composed of a combination of an acceleration section 61, a uniform-motion section 62, and a deceleration section 63.

Meanwhile, when the current position of the mobile robot belongs to the uniform motion section or a stop section, the uniform-motion-determining unit 120 transmits a first control signal to the pose-calculating unit 130. When the current position of the mobile robot belongs to the acceleration section or the deceleration section, the uniform-motion-determining unit 120 transmits a second control signal to the pose-calculating unit 130.

The accelerometer 125 has an accelerator having two or more axes. In general, since a mobile robot used for cleaning moves while contacting the floor, an accelerometer for measuring acceleration in the vertical direction of the floor is not needed. The output of the accelerometer 125 is transmitted to the pose-calculating unit 130.

The pose-calculating unit 130 uses the acceleration due to gravity to calculate the pitch and the roll. A detailed calculating process will be described with reference to FIGS. 7 and 8.

Figure 7:
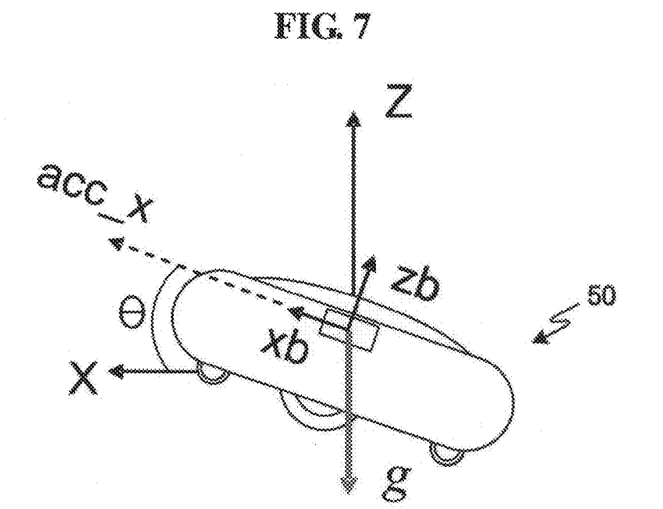
FIG. 7 is a diagram illustrating the relationship between acceleration in the $x_b$-axis direction and the acceleration due to gravity when a pitch occurs in the mobile robot.

FIG. 7 is a diagram illustrating the relationship between acceleration acc_x in the $x_b$-axis direction and the acceleration due to gravity g when a pitch θ occurs in the mobile robot 50. Assuming that the mobile robot 50 stops or moves at a constant velocity, the pitch θ can be calculated by a geometrical theorem by means of Equation 1:

$$\theta = \arcsin(acc\_x/g) \quad (1)$$

Figure 8:
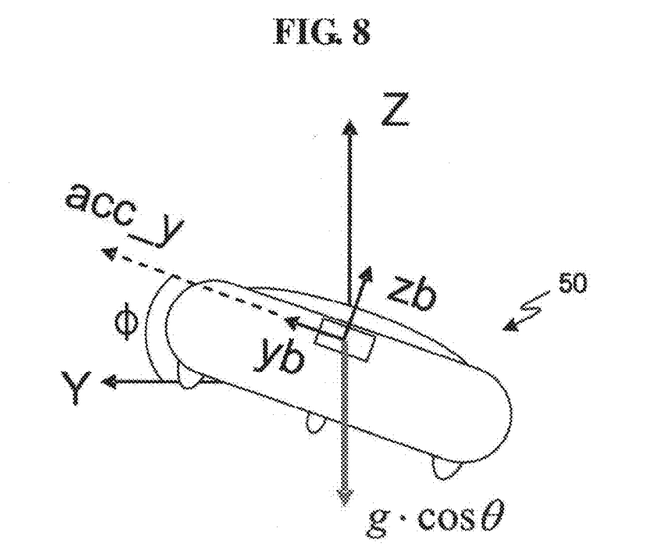
FIG. 8 is a diagram illustrating the relationship between acceleration in the $y_b$-axis direction and the acceleration due to gravity when a roll occurs in the mobile robot.

FIG. 8 is a diagram illustrating the relationship between acceleration acc_y in the $y_b$-axis direction and the acceleration due to gravity g when a roll Φ additionally occurs in the mobile robot 50 shown in FIG. 7. Since the pitch has already occurred in the mobile robot in FIG. 7, the vertical component of the acceleration due to gravity is g·cos θ. Therefore, assuming that the mobile robot 50 stops or moves at a constant velocity, the roll Φ can be calculated by using Equation 2:

$$\Phi = \arcsin(acc\_y/g/\cos\theta) \quad (2)$$

In the sections in which the mobile robot 50 is not accelerated or decelerated, the accelerometer 125 can use Equations 1 and 2 to calculate the pitch and the roll, without using a pitch gyrosensor and a roll gyrosensor. In order to calculate the pitch and the roll, the pose-calculating unit 130 receives from the uniform-motion-determining unit 120 information about whether the current position of the mobile robot belongs to the uniform motion section or the stop section. That is, the roll and the pitch are calculated in only the section in which the first control signal is received from the uniform-motion-determining unit 120.

Figure 9:
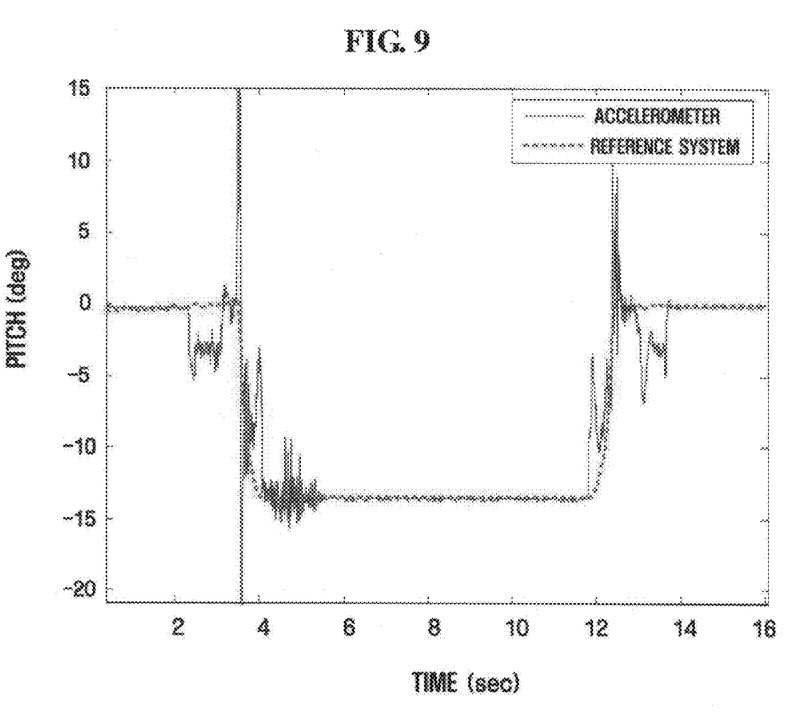
FIG. 9 is a graph illustrating comparison between the pitch calculated by an accelerometer and the pitch calculated by a reference system.

FIG. 9 shows that the pitch calculated by the accelerometer in the sections other than the acceleration section and the deceleration section is substantially matched with the pitch calculated by a reference system (for example, the pitch gyrosensor).

Figure 10:
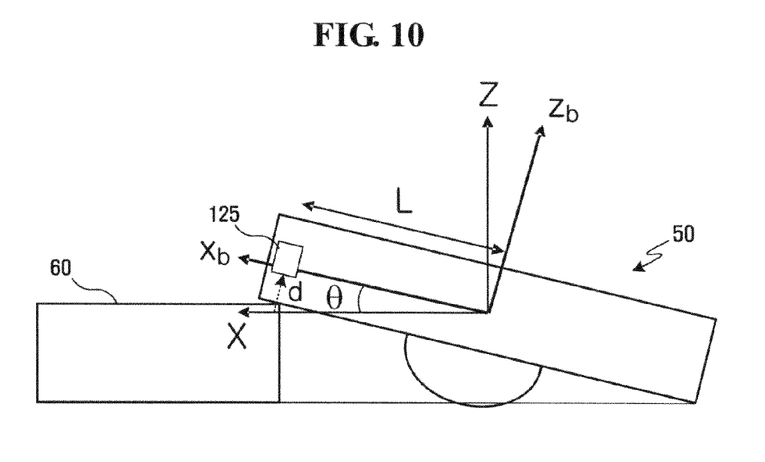
FIG. 10 is a diagram illustrating the principle of a method of calculating a pitch using an accelerometer when the mobile robot is accelerated or decelerated.

As described above, it is possible to calculate the pitch in the acceleration and deceleration sections, in addition to calculating the pitch and the roll in the sections other than the acceleration and deceleration sections. FIG. 10 is a diagram illustrating the accelerometer 125 provided to a front end of the mobile robot 50 to calculate the pitch θ in the acceleration and deceleration sections. In FIG. 10, the front end of the mobile robot 50 is lifted by an obstacle 60. In FIG. 10, L indicates the distance from the center of the mobile robot 50 (specifically, the center of the traveling wheel) to the accelerometer 125, and d indicates displacement (lifting) in the $z_b$-axis direction that is calculated by the accelerometer 125. The displacement d can be obtained by integrating acceleration acc_z in the $z_b$-axis direction with respect to time twice. The pitch θ can be calculated by Equation 3:

$$\theta = d/L \quad (3)$$

Meanwhile, in the acceleration and deceleration sections, the acceleration acc_x in the $x_b$-axis direction and $y_b$-axis direction is high. Therefore, when slipping occurs in the motion of the mobile robot, it is difficult to trust the value obtained by the encoder 115. In this case, it is possible to calculate the displacement of the mobile robot by integrating the acceleration twice. However, it is necessary to convert an acceleration component in the local coordinate system into an acceleration component in the global coordinate system, prior to calculating the displacement of the mobile robot using the above-mentioned method.

The pose-compensating unit 140 uses the pitch θ and the roll Φ calculated by the pose-calculating unit 130 to convert an acceleration component $acc_b$ in the local coordinate system into an acceleration component $acc_w$ in the global coordinate system using Equation 4:

$$acc_w = R * acc_b, \text{ where } R \text{ is a transform matrix,} \quad (4)$$

$$R = \begin{bmatrix} \cos\theta & \sin\phi\sin\theta & \cos\phi\sin\theta \\ 0 & \cos\phi & -\sin\phi \\ -\sin\theta & \sin\phi\cos\theta & \cos\phi\cos\theta \end{bmatrix}.$$

Figure 11:
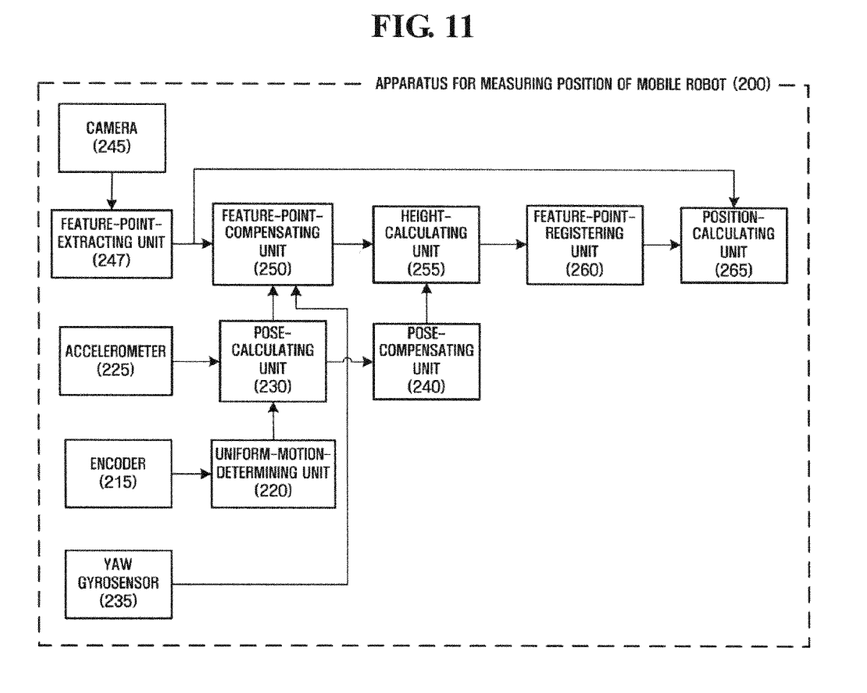
FIG. 11 is a block diagram illustrating the structure of an apparatus for measuring the position of a mobile robot according to another embodiment of the invention.

Meanwhile, FIG. 11 is a block diagram of the structure of an apparatus 200 for measuring the position of a mobile robot according to an embodiment of the invention, to which the basic conception used for the apparatus 100 for measuring the position of the mobile robot shown in FIG. 5 is applied.

In FIG. 11, an encoder 215, a uniform-motion-determining unit 220, an accelerometer 225, a pose-calculating unit 230, and a pose-compensating unit 240 have the same functions and operations as the encoder 115, the uniform-motion-determining unit 120, the accelerometer 125, the pose-calculating unit 130, and the pose-compensating unit 140, and thus a detailed description thereof has been omitted. The description focuses on the difference between the apparatuses 200 and 100.

A camera 245 is provided on an upper surface of the mobile robot to capture a ceiling image. The camera 245 may be composed of a CCD (charge coupled device), a CMOS (complementary metal oxide semiconductor), or other known image capturing devices, and further include an A/D (analog-to-digital) converter for converting analog signals of a captured image to digital signals.

Figure 12:
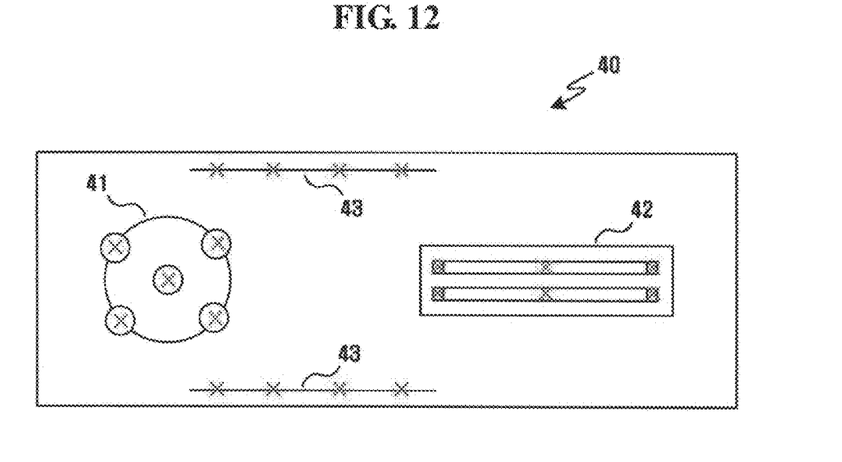
FIG. 12 is a diagram illustrating examples of feature points extracted from a ceiling image.

The feature-point-extracting unit 247 extracts one or more feature points from the ceiling image captured by the camera 245. The feature points are points identifying a specific position. The feature points are preferably selected as points indicating unique characteristics of the specific position. For example, when a ceiling image 40 shown in FIG. 12 is captured, the ceiling image 40 may include detailed images of a chandelier 41, a fluorescent lamp 42, and edges 43 that are discriminated from other positions.

Similar to the pose-calculating unit 130 shown in FIG. 5, the pose-calculating unit 230 can calculate the pitch θ using Equation 1 and the roll Φ using Equation 2 in the uniform motion section or the stop section. The pose-calculating unit 230 can calculate the pitch θ using Equation 3.

A feature-point-calculating unit 250 compensates for the pose of the camera 245 using the pitch θ and the roll Φ calculated by the pose-calculating unit 230, and a yaw ψ calculated by a yaw calculating unit 235. As shown in FIG. 2, even when the mobile robot does not move, the ceiling image is changed due to only a variation in the pose of the mobile robot. In this case, the mobile robot may be determined to move. Therefore, a process of compensating for the pose of the camera is essential.

Specifically, feature coordinates $P_{comp}$ that are compensated by the process of compensating for the pose of the camera can be calculated by multiplying a transform matrix by feature coordinates $P_{raw}$ obtained from the ceiling image, as shown in Equation 5 given below:

$$P_{comp} = Q * P_{raw}, \quad (5)$$

where $$Q = \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}.$$

A height-calculating unit 255 calculates the height from the mobile robot to the compensated feature point. This is because the displacement of the mobile robot can be calculated on the basis of the height the mobile robot to the compensated feature point, and the position of the mobile robot can be calculated by accumulating the displacement.

Figure 13:
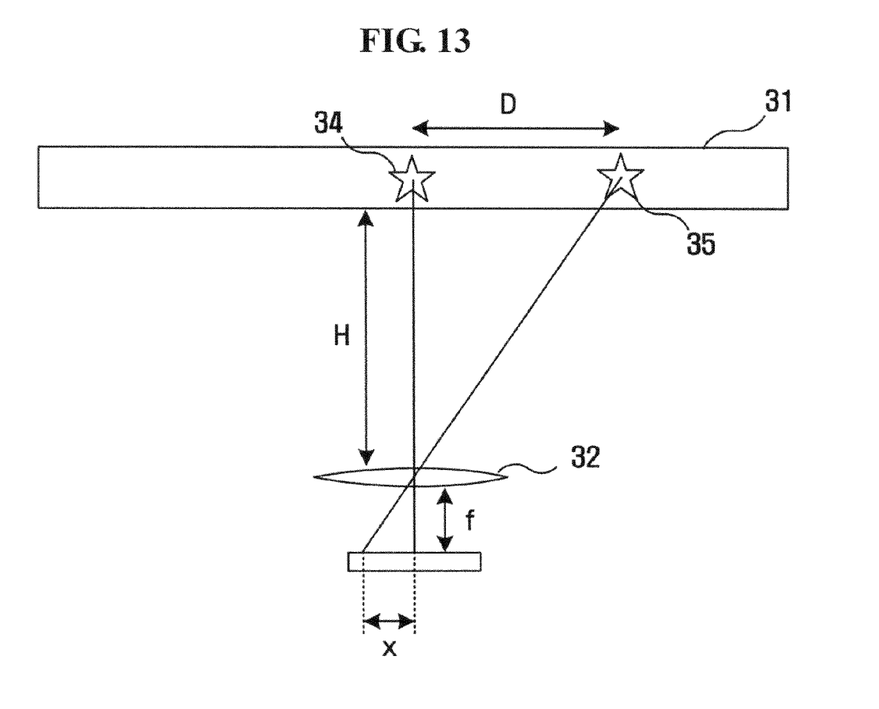
FIG. 13 is a diagram illustrating the geometrical relationship between the displacement of the mobile robot and the height of the feature point.

FIG. 13 is a diagram illustrating the geometrical relationship between a displacement D of the mobile robot and the height H of a feature point 34. In FIG. 13, the feature point 34 of the camera 245 is observed at a time $t_1$, and the displacement of the mobile robot from the feature point 34 to a feature point 35 is observed at a time $t_2$. In this case, when the displacement of the feature point 34 in an image coordinate system is x, the relationship represented by the following Equation 6 is established between the displacement D and the height H:

$$D = H * x / f, \quad (6)$$

where f is a focal distance of a lens 32 of the camera 245.

As can be seen from Equation 6, the focal distance f is a fixed value, and x is a value that can be obtained from the compensated ceiling image. Therefore, only the height H is needed to calculate the displacement D of the mobile robot from the compensated ceiling image.

However, in a feature-point-registering stage, the height H of a specific feature point should be calculated from a reliable displacement D. However, when slipping occurs, the displacement D calculated by the encoder 215 is unreliable, and thus it takes a lot of time to register the feature point.

The present embodiment of the invention proposes a method of using a displacement transmitted from the pose-compensating unit 240 (displacement obtained by the accelerometer) as the displacement D. This is because the displacement transmitted from the pose-compensating unit 240 is not affected by slipping. Of course, the displacement transmitted from the pose-compensating unit 240 is a value obtained by multiplying the pitch and the yaw calculated by the pose-calculating unit 230 by a transform matrix (R in Equation 4).

As described above, the feature point of the ceiling image is compensated by the feature-point-compensating unit 250, and the height of the feature point is calculated. Then, the feature point is registered in a predetermined memory by the feature-point-registering unit 260.

When the feature point is registered, it is possible to calculate the displacement D of the mobile robot in real time using the height H of the feature point.

A position-calculating unit 265 can compare the feature point extracted from the ceiling image captured in real time while the mobile robot is moving with the feature point (including the height H) registered in the feature-point-registering unit 260 to calculate the displacement of the mobile robot. At that time, Equation 6 is used to calculate the displacement D. The position-calculating unit 265 can accumulate the calculated displacement at the existing position of the mobile robot to check the current position of the mobile robot.

The components shown in FIGS. 5 and 11 may be composed software components, such as tasks, classes, sub-routines, processes, objects, execution threads, and programs, hardware components, such as a field-programmable gate array (FPGA) and an application specific integrated circuit (ASIC), or combinations of the software components and the hardware components. The components may be stored in a computer-readable storage medium, or they may be dispersed in a plurality of computers.

Although the embodiments of the invention have been described above with reference to the accompanying drawings, it will be apparent to those skilled in the art that various modifications and changes may be made thereto without departing from the scope and spirit of the invention. Therefore, it should be understood that the above embodiments are not limitative, but illustrative in all aspects.

According to the above-described embodiments, it is possible to measure the pose of a mobile robot using an accelerometer, eliminating the need for a pitch gyrosensor and a roll gyrosensor.

Further, it is possible to effectively measure the position of a mobile robot by combining a camera, an inertia sensor, and an encoder.

What is claimed is:

1. An apparatus for measuring the pose of a mobile robot, comprising:
   an accelerometer measuring acceleration of the mobile robot in a forward direction;
   a uniform-motion-determining unit determining whether the mobile robot belongs to a uniform motion section, an acceleration section, or a deceleration section; and
   a pose-calculating unit calculating a pitch and a roll of the mobile robot in the uniform motion section, using the relationship between the measured acceleration in the forward direction and the acceleration due to gravity, wherein
   the accelerometer is mounted to a front end of the mobile robot; and
   the pose-calculating unit calculates the pitch in the acceleration and deceleration sections from d/L,
   where d is a lifting distance of the mobile robot, and L is the distance from a center of the mobile robot to the accelerometer.

2. The apparatus of claim 1, further comprising:
   an encoder detecting the rotational speed of traveling wheels of the mobile robot,
   wherein the uniform-motion-determining unit determines which of these sections the mobile robot belongs to, on the basis of a profile of the rotational speed.

3. The apparatus of claim 1, further comprising:
   a pose-compensating unit calculating the acceleration of the mobile robot in the forward direction in a global coordinate system using the calculated pitch, roll, and acceleration in the forward direction.

4. The apparatus of claim 3, wherein the pose-compensating unit calculates the acceleration in the forward direction in the global coordinate system by multiplying the measured acceleration in the forward direction by a transform matrix based on the calculated pitch and roll, where the transform matrix is represented by $$\begin{bmatrix} \cos\theta & \sin\phi\sin\theta & \cos\phi\sin\theta \\ 0 & \cos\phi & -\sin\phi \\ -\sin\theta & \sin\phi\cos\theta & \cos\phi\cos\theta \end{bmatrix},$$

$\theta$ indicates the calculated pitch, and $\Phi$ indicates the calculated roll.

5. The apparatus of claim 1, wherein:
   the pose-calculating unit calculates the pitch from arcsin (acc_x/g), and
   when the calculated pitch is $\Phi$, the pose-calculating unit calculates the roll from arcsin (acc_y/g/cos$\theta$),
   where acc_x indicates an acceleration component in the traveling direction of the mobile robot in a local coordinate system, acc_y indicates an acceleration component in a direction vertical to the traveling direction of the mobile robot in the local coordinate system, and g indicates the acceleration due to gravity.

6. An apparatus for measuring the position of a mobile robot, comprising:
   an accelerometer measuring the acceleration of the mobile robot in a forward direction;
   a uniform-motion-determining unit determining whether the mobile robot belongs to a uniform motion section, an acceleration section, or a deceleration section;
   a pose-calculating unit calculating a pitch and a roll of the mobile robot in the uniform motion section, using the relationship between the measured acceleration in the forward direction and the acceleration due to gravity;
   a camera disposed on an upper surface of the mobile robot to capture a ceiling image;
   a feature-point-extracting unit extracting feature points from the captured ceiling image;
   a feature-point-compensating unit compensating for the coordinates of the extracted feature point using the calculated pitch and roll; and
   a position-calculating unit calculating the displacement of the mobile robot on the basis of the feature point whose coordinates are compensated.

7. The apparatus of claim 6, wherein:
   the pose-calculating unit calculates the pitch from arcsin (acc_x/g); and
   when the calculated pitch is $\theta$, the pose-calculating unit calculates the roll from arcsin (acc_y/g/cos$\theta$),
   where acc_x indicates an acceleration component in the traveling direction of the mobile robot in a local coordinate system, acc_y indicates an acceleration component in a direction vertical to the traveling direction of the mobile robot in the local coordinate system, and g indicates the acceleration due to gravity.

8. The apparatus of claim 6, further comprising:
   a pose-compensating unit calculating acceleration in the forward direction in a global coordinate system, using the calculated pitch and roll and the measured acceleration in the forward direction; and
   a height-calculating unit calculating the height from the mobile robot to the compensated feature point using the moving distance obtained from the calculated acceleration in the forward direction.

9. The apparatus of claim 8, wherein the pose-compensating unit calculates the acceleration in the forward direction in the global coordinate system by multiplying the measured acceleration in the forward direction by a transform matrix based on the calculated pitch and roll, and represented by $$\begin{bmatrix} \cos\theta & \sin\phi\sin\theta & \cos\phi\sin\theta \\ 0 & \cos\phi & -\sin\phi \\ -\sin\theta & \sin\phi\cos\theta & \cos\phi\cos\theta \end{bmatrix},$$

where θ indicates the calculated pitch, and Φ indicates the calculated roll.

10. The apparatus of claim 8, wherein the height-calculating unit calculates the height from D*f/x,
where D indicates the moving distance of the mobile robot that is calculated from the acceleration in the forward direction, f indicates a focal distance, and x indicates the displacement of the feature point in the ceiling image captured by the camera.

11. The apparatus of claim 6, wherein the position-calculating unit calculates the displacement of the mobile robot from H*f/x,
where H indicates the height of the feature point, f indicates a focal distance, and x indicates the displacement of the feature point in the ceiling image captured by the camera.

12. The apparatus of claim 6, wherein the feature-point-compensating unit compensates for the coordinates by multiplying the coordinates of the extracted feature point by a transform matrix:

$$\begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}.$$

where θ and Φ respectively indicate the pitch and the roll calculated by the pose-calculating unit, and ψ indicates a yaw calculated by a yaw gyrosensor.

13. A method of measuring the pose of a mobile robot, comprising:
measuring acceleration of the mobile robot in a forward direction using an accelerometer;
determining, by at least one processor, whether the mobile robot belongs to a uniform motion section, an acceleration section, or a deceleration section; and
calculating a pitch and a roll of the mobile robot in the uniform motion section, using the relationship between the measured acceleration in the forward direction and the acceleration due to gravity, wherein
the accelerometer is mounted to a front end of the mobile robot; and
the calculating includes calculating the pitch in the acceleration and deceleration sections from d/L,
where d is a lifting distance of the mobile robot, and L is the distance from a center of the mobile robot to the accelerometer.

14. The method of claim 13, further comprising:
detecting the rotational speed of traveling wheels of the mobile robot,
wherein the determining of the section of the mobile robot is performed on the basis of a profile of the rotational speed.

15. The method of claim 13, further comprising:
calculating the acceleration of the mobile robot in the forward direction in a global coordinate system using the calculated pitch and roll and the measured acceleration in the forward direction.

16. The method of claim 13, wherein the calculating of the pitch and the roll comprises:
calculating the pitch from arcsin (acc_x/g); and
when the calculated pitch is θ, calculating the roll from arcsin (acc_y/g/cosθ),
where acc_x indicates an acceleration component in the traveling direction of the mobile robot in a local coordinate system, acc_y indicates an acceleration component in a direction vertical to the traveling direction of the mobile robot in the local coordinate system, and g indicates the acceleration due to gravity.

17. A method of measuring the position of a mobile robot, comprising:
measuring acceleration of the mobile robot in a forward direction using an accelerometer;
determining, by at least one processor, whether the mobile robot belongs to a uniform motion section, an acceleration section, or a deceleration section;
calculating a pitch and a roll of the mobile robot in the uniform motion section, using the relationship between the measured acceleration in the forward direction and the acceleration due to gravity;
capturing a ceiling image;
extracting feature points from the captured ceiling image;
compensating for the coordinates of the extracted feature point using the calculated pitch and roll; and
calculating the displacement of the mobile robot on the basis of the feature point whose coordinates have been compensated.

18. The method of claim 17, further comprising:
calculating acceleration in the forward direction in a global coordinate system, using the calculated pitch and roll and the measured acceleration in the forward direction; and
calculating the height from the mobile robot to the compensated feature point using the moving distance obtained from the calculated acceleration in the forward direction.

19. The method of claim 18, wherein the calculating of the height comprises:
calculating the height from D*f/x,
where D indicates the moving distance of the mobile robot that is calculated from the acceleration in the forward direction, f indicates. a focal distance, and x indicates the displacement of the feature point in the ceiling image captured by the camera.

20. The method of claim 17, wherein the calculating of the displacement comprises:
calculating the displacement of the mobile robot from H*f/x,
where H indicates the height of the feature point, f indicates a focal distance, and x indicates the displacement of the feature point in the ceiling image captured by the camera.

* * * * *

UNITED STATES PATENT AND TRADEMARK OFFICE
CERTIFICATE OF CORRECTION

PATENT NO. : 7,996,179 B2
APPLICATION NO. : 12/219235
DATED : August 9, 2011
INVENTOR(S) : Hyoung-Ki Lee et al.

It is certified that error appears in the above-identified patent and that said Letters Patent is hereby corrected as shown below:

Column 10, Line 14, In Claim 5, delete "$\phi$," and insert -- $\theta$, --, therefor.

Column 12, Line 49, In Claim 19, delete "indicates." and insert -- indicates --, therefor.

Signed and Sealed this
Fourteenth Day of February, 2012

David J. Kappos
*Director of the United States Patent and Trademark Office*